United States Patent [19]

Bradt

[11] Patent Number: 5,500,175
[45] Date of Patent: Mar. 19, 1996

[54] PROCESS OF PRODUCING HEAT-SOFTENABLE, HOPPER-FEEDABLE PLASTIC PELLETS CONTAINING FOLDED REINFORCING FIBERS

[76] Inventor: Rexford H. Bradt, 725 E. Fort Wayne St., Warsaw, Ind. 46580

[21] Appl. No.: 333,504

[22] Filed: Nov. 2, 1994

[51] Int. Cl.$^6$ ............................................. B29C 53/02
[52] U.S. Cl. .................. 264/151; 264/210.2; 264/282; 264/172.12; 264/171.23
[58] Field of Search ................................ 428/361, 362; 264/143, 148, 151, 174, 141, 103, 108, 168, 171, 176.1, 210.1, 210.2, 175, 282; 425/327

[56] References Cited

FOREIGN PATENT DOCUMENTS 62-97806   5/1987   Japan .

*Primary Examiner*—Romulo H. Delmendo
*Attorney, Agent, or Firm*—Roger M. Rickert

[57] ABSTRACT

Process and product for manufacturing continuous fiber reinforced sheets and shapes. A pressurized extrusion process consisting of a paired and edge enclosing doctor blades that remove feed material from a pair of pinch rolls and contain such in an optimally heated environment and which provides suitable hot dies and enables extrusion of continuous reinforcements, cores or threads to be contained in the extrudite. Hopper feedable plastic pellets containing reinforcing fibers which are longer than the largest pellet dimension are disclosed. The fibers in an elongated web of fiber reinforced plastic are caused to be wrinkled or folded prior to cutting the web into pellets. One form of apparatus includes a set of conveyor rollers for moving the web, with later rollers moving more slowly that the input rollers, in conjunction with a crowding doctor blade which forces the web with a creping action from the input rollers. Also fabrication of a continuous web of continuous fiber reinforced plastic material includes supplying a continuous substantially linear collection of fiber strands at a first velocity and saturating or impregnating that linear collection of strands with a plastic. The linear strands may be coated by passing the strands through a heated plastic extruding crosshead die. Thereafter, motion of the plastic coated linear strands is impeded so as to increase the cross-sectional area and deform the strands from their linear.

10 Claims, 4 Drawing Sheets

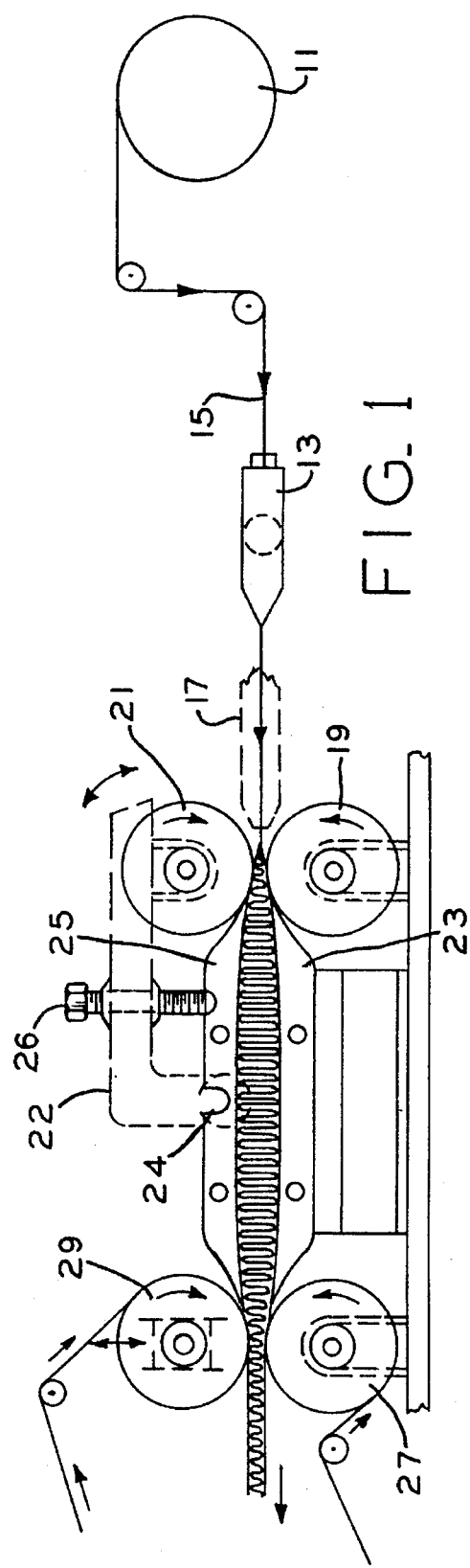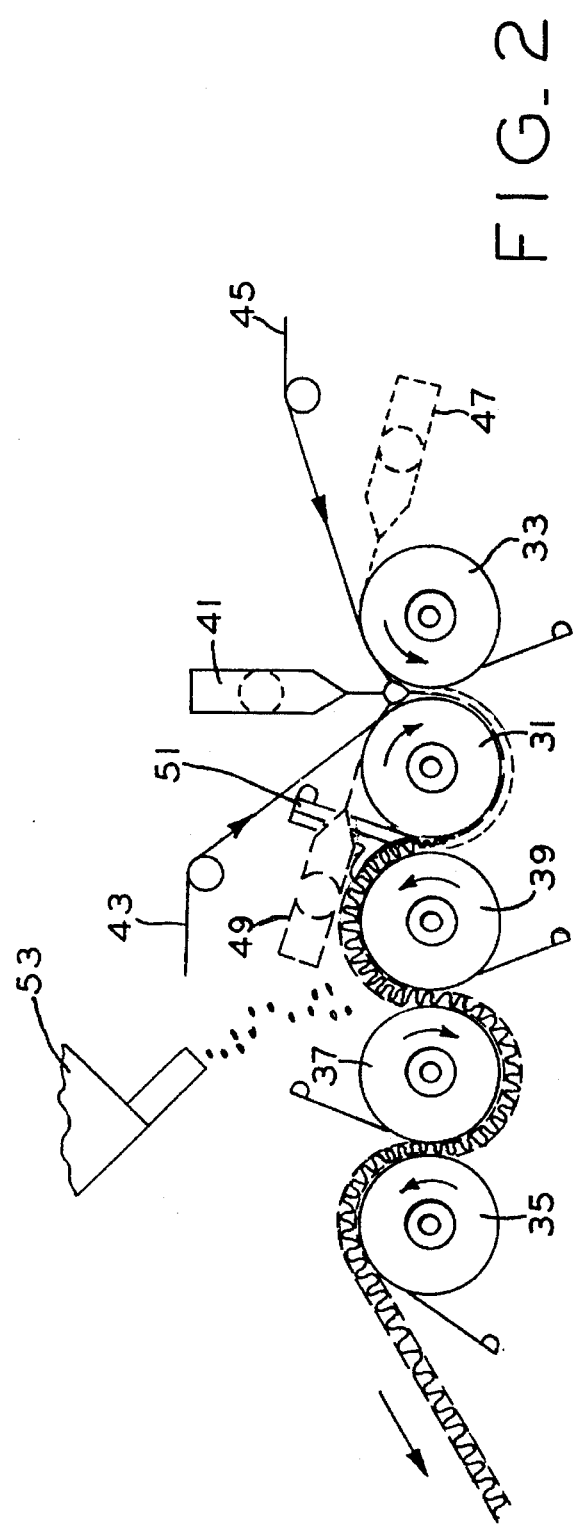

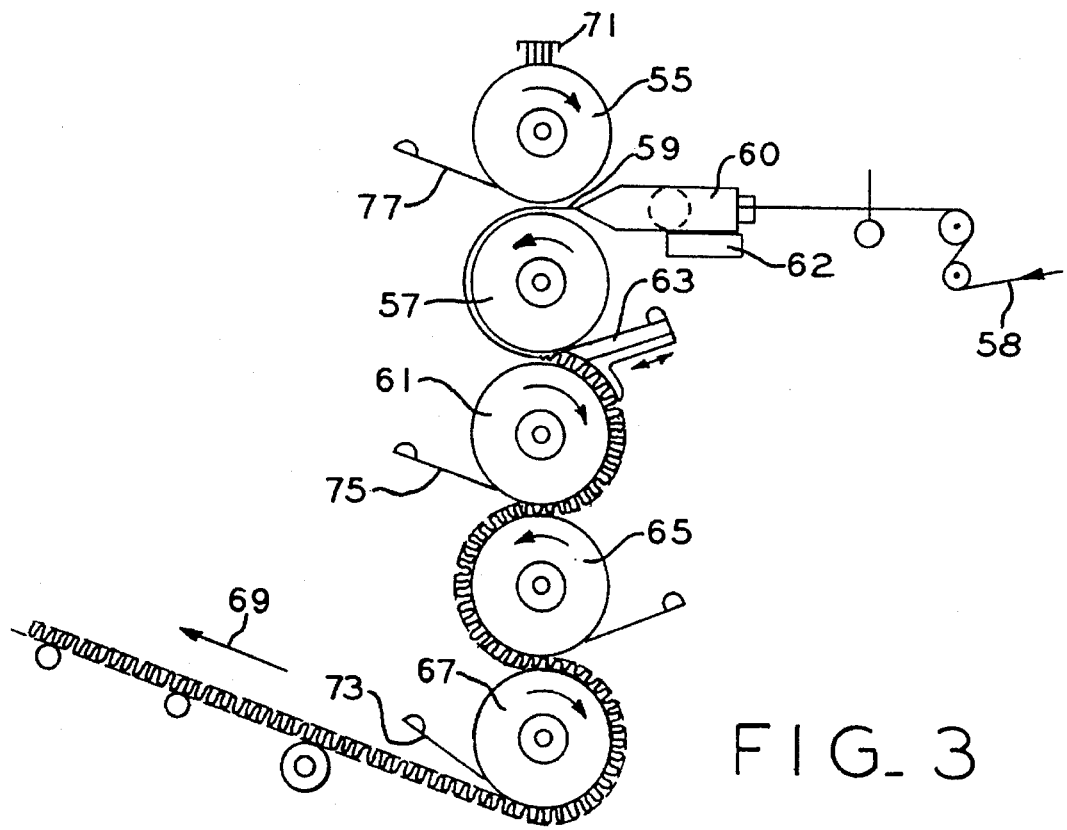
FIG_3
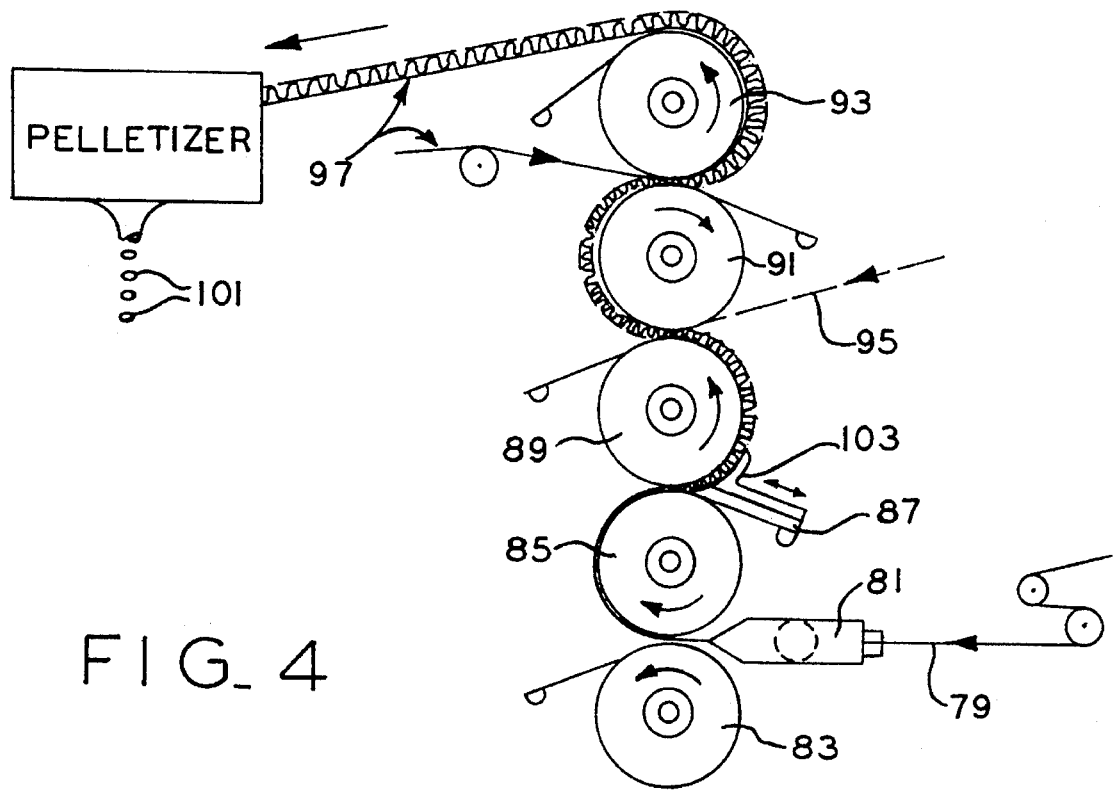
FIG_4

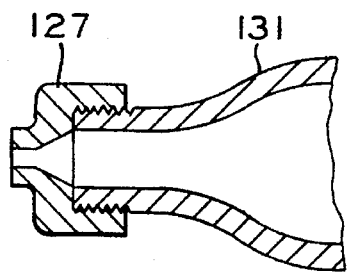
FIG_8
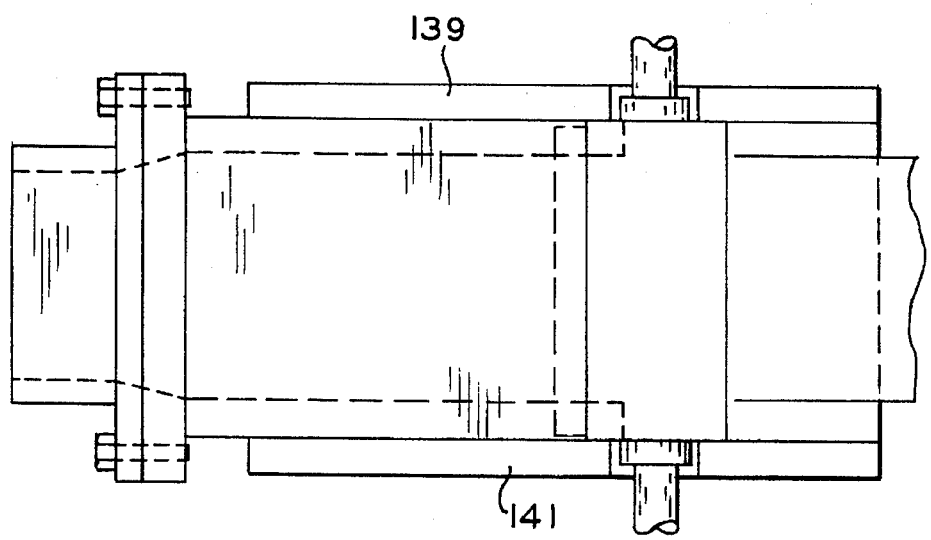
FIG_9
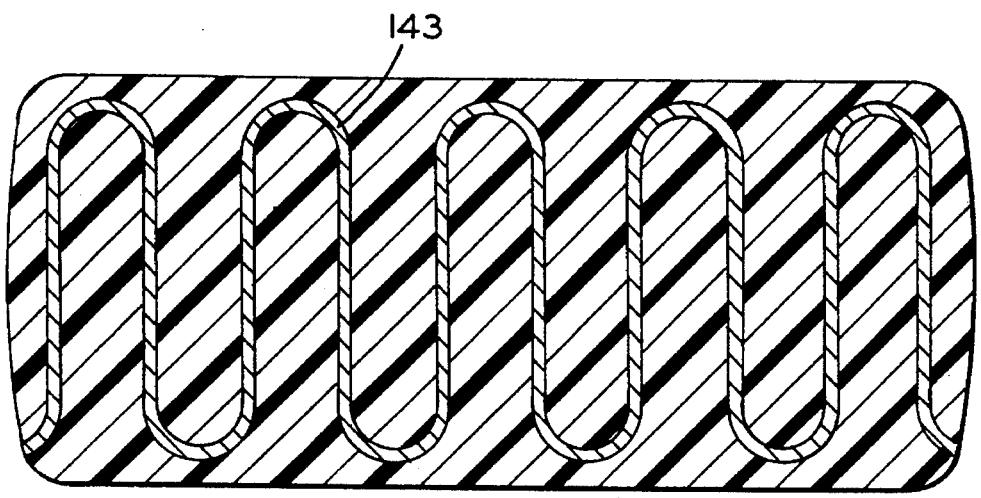
FIG_10

PROCESS OF PRODUCING HEAT-SOFTENABLE, HOPPER-FEEDABLE PLASTIC PELLETS CONTAINING FOLDED REINFORCING FIBERS

SUMMARY OF THE INVENTION

The present invention relates generally to the manufacture of hopper feedable plastic pellets as used, for example, as the input material for injection molding and extrusion machines, and more particularly to the manufacture of such pellets for use in making fibrous reinforced injection molded parts. A salient goal of the present invention is the production of pellets containing fibers of a length greater than the largest linear dimension of to such pellets.

Hopper feeding of pelletized plastic to injection molding machines is commonplace. It is also common to reinforce plastic parts with fibers such as glass or carbon. When employing a hopper fed injection molding machine to fabricate fiber reinforced parts, if the fibers are contained within the pellets, the fiber lengths are customarily limited to the longest dimension of the individual pellets. Moldable and feedable pellets containing longer fibers for forming stronger fiber reinforced parts, which up to now have been unavailable, would be highly desirable. Such pellets would be of general utility, but find particular applicability in the apparatus and technique disclosed in my copending application Ser. No. 08/333,503, pending, entitled WELD LINE SUPPRESSION filed on even date herewith, the entire disclosure of which is specifically incorporated herein by reference. This application teaches how to overcome some of the problems previously inherent in molding very long fibers.

In the manufacture of crepe paper, a thin web of wet paper is transferred to the surface of a heated rotating drum, A doctor blade (stationary scraper) engages the paper causing it to wrinkle as it leaves the drum surface. The thus "creped" paper is then conveyed to an oven for additional drying.

Attempts have been made to duplicate the crepe paper technique to create a similarly wrinkled sheet of plastic, however, most hot, thin, still pliable sheets of extruded plastic slide too freely and fail to wrinkle. I have found the use of a heated doctor blade and closely controlled temperatures may cause some plastic webs to cling sufficiently to "crepe", however, this process is difficult to control and generally does not develop sufficient "extruding" pressure on the material.

Among the several objects of the present invention may be noted the provision of a reinforcing fiber containing pellet in which the fiber length exceeds the pellet length; the provision of a process for creping a plastic ribbon, tape or web containing reinforcing fibers; and utilization of the process of the previous object in the formation of hopper feedable plastic pellets. These as well as other objects and advantageous features of the present invention will be in part apparent and in part pointed out hereinafter.

in general, a machine for producing an elongated web of plastic material containing folded reinforcing fibers has, according to the present invention, a source of an elongated web of fiber reinforced plastic material and at least one input roller about which that web moves. There may be a pair of output pinch rollers between which the web moves at a linear velocity less than the peripheral velocity at which the web moves about the input roller, or merely an output die which shapes a strand or web. Finally, a doctoring and restraining component arrangement intermediate the input roller and the output pinch rollers compresses the web in its direction of elongation thereby folding reinforcing fibers. This arrangement may include a web impediment such as a crowding doctor blade at a preferred location along the path for causing the web to wrinkle. Such a crowding doctor blade or blades may be positioned closely adjacent to the surface of the input roller so as to engage the web and force it from the input roller surface. This arrangement combined with the slower output speed of the web, causes a folding of the reinforcing fibers to increase the fiber length per unit of web length in the direction of web elongation.

Also in general and in one form of the invention, a heat softenable, hopper feedable plastic molding pellet contains elongated reinforcing fibers. The length of the fibers exceeds the largest linear dimension of the pellet. A foaming agent may be incorporated within the pellet.

Still further in general and in one form of the invention, a machine for producing an elongated web of plastic material containing folded reinforcing fibers has an input source of an elongated web of fiber reinforced plastic material. There are a pair of input pinch rollers between which the elongated web of fiber reinforced plastic material moves. There is a flow restrictive output die from which the elongated web of fiber reinforced plastic material moves and an arrangement intermediate the input rollers and the output die for compressing the web in its direction of elongation thereby folding the reinforcing fibers. The fibers are continuous and essentially straight when they pass between the input pinch rollers while those fibers are continuous with substantial portions extending obliquely to the direction of web elongation when they pass from the output die.

BRIEF DESCRIPTION OF THE DRAWING

FIG. 1 is a somewhat schematic side elevation illustration of apparatus for producing fiber reinforced molding pellets according to the present invention in one form;

FIG. 2 is a somewhat schematic side elevation illustration of alternative apparatus for producing fiber reinforced pellets;

FIG. 3 is a view similar to FIG. 2, but showing several modifications;

FIG. 4 is a view similar to FIGS. 2 and 3, but showing further modifications;

FIG. 8 is a view in cross-section along lines 8—8 of FIG. 7 showing the doctor blade and strand shaping die;

FIG. 9 is a somewhat schematic top plan view of apparatus similar to that of FIG. 6, but modified to extrude a continuous fiber reinforced plastic sheet; and FIG. 10 is a view in cross-section of an illustrative heat softenable, hopper feedable plastic molding pellet containing elongated reinforcing fibers.

Corresponding reference characters indicate corresponding parts throughout the several views of the drawing. Certain features shown in some of the views are readily adaptable to apparatus views in which those features do not appear.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 5:
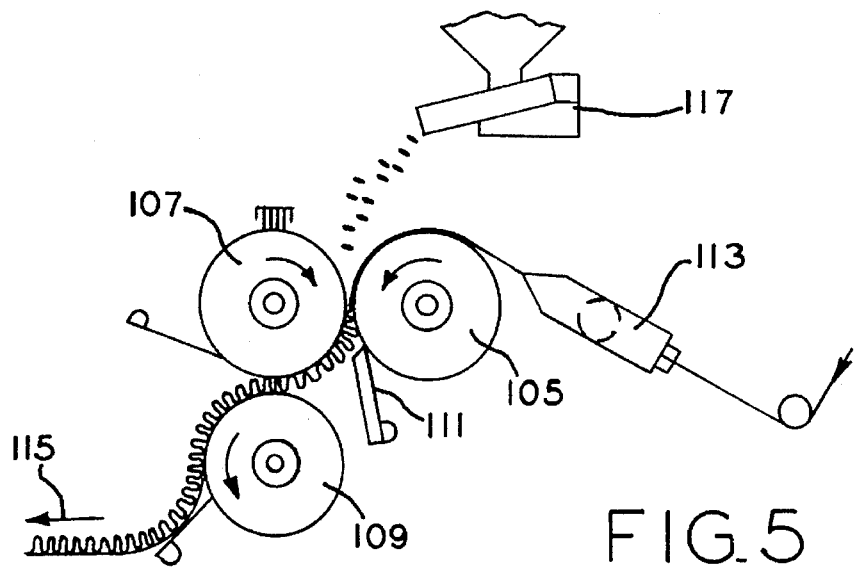
FIG. 5 is a view similar to FIGS. 2–4, but showing only one higher speed input roller.

In FIG. 1, a roll or equivalent source of reinforcement strands 11 supplies a web 15 of those strands to an extruder melt crosshead 13 wherein the strands are intimately commingled with a thermoplastic material. The resulting elongated web of fiber reinforced plastic material 17 passes between a pair of counter-rotating input pinch rollers 19 and 21. A pair of crowding doctor blades 23 and 25 are located near the outrunning nip of rollers 19 and 21 with each doctor blade being positioned closely adjacent the surface of a corresponding input pinch roller. The doctor blades 23 and 25 serve in this embodiment not only to force the web from the surfaces of the input rollers, but also to confine the web above and below as it passes toward and eventually between a pair of counter-rotating output pinch rollers 27 and 29. A pair of side plates (not shown) confine the web in the horizontal direction orthogonal to its direction of motion. These plates may be similar to the side dams described later in conjunction with the embodiment of FIGS. 6 and 7. Also, the plates may taper toward one another to force the folded film out an orifice as a generally rod-like structure or strand if desired. Both the doctor blades and the slower running of the output rollers contribute to the accordion-like folding of the fibers, however, in practice, the folding is typically more random than illustrated. As with all the disclosed embodiments, the output web from the rollers 27 and 29 may be re-reeled for later pelletization, may be directly fed to a pelletizer as shown in FIG. 4, or otherwise utilized as desired. The support bearings for roller 21 are mounted on a pair of rocker arms 22 which pivot at 24 (outboard of the doctor blade 25). The tip end of adjustment screw 26 is fixed to a flexible portion of doctor blade 25 thereby moving that blade to accommodate splices in the web or other variations in web feed. The adjustment screw 26 also provides for precise adjustment of the doctor blade 25.

For Example, with all four illustrated rollers 11½ inches in diameter, the input pair 19 and 21 may accept a ⅟32 inch thick web while running at 68 RPM. With the output pair operating at 11½ RPM, the output cross-sectional area will be about 6 times the input area and fiber lengths will be about 6 times the resulting pellet length. In this case, it is possible to produce pellets about ½ inch long containing 3 inch long fibers.

In FIG. 2, there are not only a pair of input rollers 31 and 33, and an output roller 35, but also a plurality of intermediate cylindrical rollers 37 and 39. In this embodiment as with those to be later discussed, the web moves between one or more input rollers and one or more output rollers in the direction of web elongation along a serpentine path about additional cylindrical rollers all having axes which are parallel to one another and, in some cases, coplanar. In FIG. 2, plastic extrudate from crosshead 41 is fed intermediate a pair of reinforcement webs or warps 43 and 45 from supply reels (not shown). Optional additional plastic extrudate may be supplied by crossheads 47 and 49. This time the web path impediment is provided by a single crowding doctor blade 51 which partially blocks the nip between counter-rotating rollers 31 and 39, and transfers the web from the more rapidly moving roller 31 to the more slowly moving cooling roller 39. Moreover, rollers 35, 37 and 39 rotate at a common peripheral speed in the directions indicated by the arrows, which speed is less that the common peripheral speed of the input rollers 31 and 33 tending to further impede web progress and induce fiber folding. An additive such as a foaming agent may be applied to the still soft web as by additive applicator 53.

In FIG. 3, the counter-rotating rollers 55 and 57 pull the web of thermoplastic laden reinforcing strands 59 into the machine. As the web exits the nip between rollers 57 and 61, the crowding doctor blade 63 strips the web from roller 57 while imparting the creping or folding action to increase the fiber length per unit of web length in the direction of web elongation. Doctor blade 63 removes the web from roller 57, but web removal from adjacent roller 55 is dependent on the web following its serpentine path about the roller stack. If necessary, a release material may be applied to roller 55 as at 71 to aid the web in parting from that roller. The web passes over two additional cylindrical or drum-shaped cooling rollers 65 and 67 before exiting the machine as indicated at 69 to be either pelletized, re-coiled for subsequent pelletization or otherwise used. All five of the cylindrical rollers have axes which lie generally parallel to one another in a common plane and each pair of adjacent rollers are driven in opposing senses about their respective axes. Cooling rollers 61, 65 and 67 are run at a somewhat slower speed than the input rollers 55 and 57. The dissimilar roller speeds along with the action of the crowding doctor blade 63 provide an impediment for compressing the web. Several additional doctor blades 73, 75 and 77 are illustrated. These run against rollers where the web is absent and function merely as cleaning blades.

In FIG. 4, the web feeds generally upwardly rather than downwardly as in FIG. 3 or laterally as in FIGS. 1 and 2. As before, incoming reinforcing strands 79 are passed through the extruder crosshead 81 and them pulled into the nip between input rollers 83 and 85. Doctor blade 87 imparts the folding or crimping to the web while stripping the web from roller 85. Rollers 83 and 85 are heated and move more rapidly than the more slowly moving cooling rollers 98, 91 and 93. A top cap sheet 95 is applied at the nip between rollers 89 and 91 while a similar bottom cap sheet 97 is provided at the next nip. FIG. 4 also illustrates the completed creped web as being directly fed to a pelletizer 99 from which individual pellets 101 are obtained. The web impediment which is at a preferred location along the path and which causes the web to wrinkle thereby folding the reinforcing fibers comprises the crowding doctor blade 87 which is positioned closely adjacent the surface of the input roller 85 for engaging the web and forcing the web from the input roller surface. Note the trailing foot 103 which functions as a troweling surface to conform the creped web to the surface of roller 89 with a relatively uniform thickness. Such a foot may be employed with the crowding doctor blades of any herein described embodiment.

In FIG. 5, the possibly heated input roller 105 feeds the web in the direction of web elongation to the crowding doctor blade 111 which is located closely adjacent the surface of roller 105. The doctor blade 11 causes the fibers to fold. The input roller and the more cool output pinch rollers 107 and 109 are all power driven cylindrical rollers with the input roller 105 being driven to rotate about its axis at a higher peripheral speed than the peripheral speed of the output pinch rollers 107 and 109 to further fold the fibers and compress the web. The linear speed of the web of reinforcing strands as it enters the extruder crosshead 113 is substantially the same as the peripheral speed of the surface of drum 105. The linear speed of the web as it exits the machine at 115 is substantially slower and equal to the peripheral speed of roller 109. However, due to the increase in web cross-section, the mass flow rate at the input and anywhere along the path prior to the doctor blade 111 location is substantially the same as the mass flow rate subsequent to that location.

Figure 6:
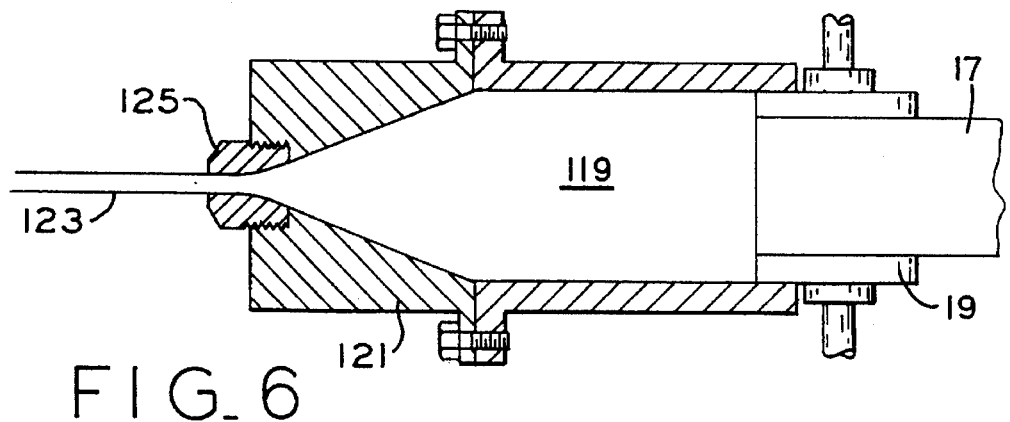
FIG. 6 is a somewhat schematic top plan view of apparatus similar to that of FIG. 1, but modified to extrude a continuous fiber reinforced plastic strand.

In FIG. 6, the feed film 17 may come, for example, from an extruder having continuous substantially linear fiber strands as an input. This feed film of plastic and continuous reinforcing fiber strands passes between the feed rolls or rollers 19 and 21 and into the confinement region 119 as in FIG. 1. Region 119 is heated and from there, the relatively soft fiber containing plastic is forced into the hot die section 121 The apparatus of FIG. 6, however, has no second set of rolls, but rather the heated continuous fiber containing material is extruded as a strand 123 having whatever cross-sectional configuration is dictated by the shape of the die orifice 125. As before, the elongated web (in this case strand 123) exits the die orifice 125 at a velocity less than the velocity at which the web moves between the input rollers 19 and 21. The strand may be subsequently chopped into pellets or retained as a strand of any preferred cross-sectional configuration.

Figure 7:
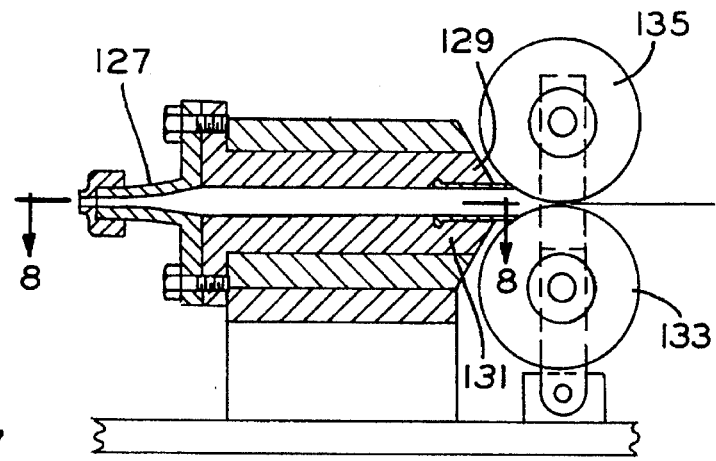
FIG. 7 is a somewhat schematic side elevation illustration of apparatus employing a single pair of feed rolls and a relatively fixed pair of doctor blades for extruding a continuous fiber reinforced plastic strand.

In FIG. 7, a heated strand die 127 is assembled to a heatable compartment defined, in part, by the relatively fixed pair of doctor blades 129 and 131. Here, the crowding doctor blades are fixed relative to one another and movable together relative to the pair of rollers 133 and 135, The pair of doctor blades and the pair of rollers are relatively biased toward one another as by a spring, fluidic cylinder or similar arrangement. As illustrated, the pair of rolls 133 and 135 are movable together horizontally relative to the doctor blade pair. The two rolls are spring biased toward one another and the upper roll 135 moves relative to the lower roll to compensate for thickness variations in the incoming web 19. Thus, as web thickness increases, roll 135 moves upwardly to provide the wider nip and to maintain contact with the crowding doctor blade 129.

The embodiment of FIG. 9 differs from that of FIGS. 7 and 8 primarily in the shape of the output die 137 which is relatively wide to provide a thin continuous fiber reinforced sheet. Also this embodiment shows removable side walls or dams 139 and 141 which retain the material laterally as it passes between doctor blades similar to 129 and 131 in FIG. 7. These side walls prevent leakage and function to hold the doctor blades fixed relative to one another, yet easily removable for sharpening or replacement. Such side dams are adaptable to many of the other embodiments and may taper toward one another to narrow the sheet to a more strand-like configuration.

In FIG. 10, there is shown, in cross-section, an illustrative heat softenable, hopper feedable plastic molding pellet with just one illustrative elongated reinforcing fiber 143. The pellet is elongated horizontally as shown and is of a uniform cross-sectional configuration in planes orthogonal to the direction of elongation. That uniform cross-sectional configuration may be square, circular or oval. The pellet dimension in the (horizontal) direction of elongation is preferably not more than four times the average of the maximum and minimum cross-sectional dimensions.

The term "web" as used herein applies to all forms of elongated reinforcing fiber input whether they be separate warp-like individual strand or strands, strands interwoven or otherwise interconnected in any way, or a mix of strands and plastic material. Also, terms such as "folded", "creped", and "wrinkled" are all intended to include somewhat random crowding or bending of reinforcing fibers as well as more uniform accordion-like or spiral compressions.

The method of operation of the invention should now be clear. Initially, an elongated web of fiber reinforced plastic material is formed and that web is moved in its direction of elongation along a path. The path is impeded as by the doctor blade and/or more slowly moving conveyor rollers, so that the progress of web motion at a preferred location along the path is also impeded. Although the mass flow rate is unchanged, web speed along the path subsequent to the impediment location is less that the web speed along the path prior to that location. This results in a compression, or creping of reinforcing fibers. The web is subsequently cut into individual pellets such as shown in FIG. 10. A wide variety of pellet shapes are possible. Upon injection molding (especially when using reciproscrew means), the fibers in those pellets will tend to lose some of their wrinkles and to straighten out to their original length thereby providing reinforcing fibers of a length substantially greater than the maximum length of the input pellets.

The embodiments of FIGS. 1 and 2 take more floor space than the vertical embodiments of FIGS. 3 and 4, however, they may be preferred for ease of loading and unloading reeled stock. Also, with the horizontal configuration of FIG. 2, any material removed by the cleaning doctor blades falls free of the web whereas more care is required to avoid contamination of the web with the vertical embodiments. Features shown in one embodiment are readily adaptable to other embodiments. For example, the optional foaming agent or other additive 117 of FIG. 5 or 53 in FIG. 2 may be applied in various ways in any of the other embodiments.

From the foregoing, it is now apparent that a novel technique for producing fiber filled materials such as heat softenable, hopper feedable plastic pellets has been disclosed meeting the objects and advantageous features set out hereinbefore as well as others, and that numerous modifications as to the precise shapes, configurations and details may be made by those having ordinary skill in the art. For example, thermoplastic materials have been described as illustrative, however, thermosetting plastics, for example, are being extruded on highly synchronized equipment, and foamable thermosets are available. Thus, the invention is not limited to any particular class of plastics. Also, while generally described in conjunction with a web or ribbon of numerous reinforcing strands, the reinforcing fiber, for example, 58 of FIG. 3, could be of a single or relatively few fibers and the crosshead 60 supported on a transverse shuttle 62 to be moved back and forth to lay the one or more strands oblique or nearly perpendicular to the direction of web motion past the rollers in order to provide a produced web or sheet having enhanced deformability properties. Such additional folding could be applied to pellets or to any other extruded shapes. The surfaces of the input rolls such as 135 may be smooth, or may be calendared, matted or otherwise textured to enhance feeding of the web without impeding the creping or removal by the doctor blade. Intermediate rolls such as 39 or output rolls such as 27 and 29 may be similarly textured or may have a pattern to be impressed on the output sheet or strand for decorative purposes, to facilitate pelletizing, or for some other end use. Also within the scope of taught apt is the inclusion of any desired fillers or other than continuous fiber strands to form products having enhanced properties of aggregate mixtures and/or blends. These and other modifications may be made without departing from the spirit of the invention or the scope thereof as set out by the claims which follow.

What is claimed is:

1. The process of producing heat softenable, hopper feedable plastic pellets containing reinforcing fibers comprising the steps of:

forming an elongated web of fiber reinforced plastic material;

moving the web in the direction of web elongation along a path;

impeding the progress of web motion at a selected location along the path so that web speed along the path subsequent to the selected location is less than the web speed along the path prior to the selected location causing the web to wrinkle thereby folding the reinforcing fibers to increase the fiber length per unit of web length; and subsequently cutting the web into individual pellets.

2. The process of claim 1 wherein the mass flow rate along the path prior to the selected location is substantially the same as the mass flow rate subsequent to the selected location.

3. The process of claim 1 wherein the web is moved in the direction of web elongation along a path between a pair of cylindrical rollers and the step of impeding includes positioning a pair of crowding doctor blades near the nip between the pair of rollers with each doctor blade closely adjacent the surface of a corresponding one of said rollers.

4. The process of claim 3 wherein the crowding doctor blades are fixed relative to one another and movable together relative to the pair of rollers, the step of impeding further including relatively biasing the pair of doctor blades and the pair of rollers toward one another.

5. The process of claim 1 wherein the web is moved in the direction of web elongation along a path about a plurality of cylindrical rollers, the step of impeding including operating certain of the rollers at peripheral speeds less than the peripheral speeds of other of the rollers.

6. The process of claim 5 in which the step of impeding further includes positioning a crowding doctor blade closely adjacent the surface of one of said other rollers.

7. The process of claim 5 in which there are a pair of input pinch rollers between which the elongated web of fiber reinforced plastic material moves, and a pair of output pinch rollers comprising said certain rollers between which the elongated web of fiber reinforced plastic material moves.

8. The process of claim 7 in which the step of impeding further includes positioning a pair of crowding doctor blades near the nip between the pair of input pinch rollers, each doctor blade being positioned closely adjacent the surface of a corresponding input pinch roller.

9. The process of claim 8 including the additional step of confining the web in directions orthogonal to its direction of motion.

10. The process of claim 7 wherein there are a plurality of cylindrical rollers the axes of which lie generally parallel to one another and including the additional step of driving each pair of adjacent rollers in opposing senses about their respective axes.

* * * * *